(12) United States Patent
Gronowski et al.

(10) Patent No.: US 7,081,502 B2
(45) Date of Patent: *Jul. 25, 2006

(54) PEROXIDE CURABLE COMPOUNDS BASED ON BUTYL-LIKE POLYMER WITHOUT CONJUGATED ALIPHATIC DIENES IN ITS COMPOSITION

(75) Inventors: Adam Gronowski, Sarnia (CA); Akhtar Osman, Sarnia (CA); Stephan Glander, Leverkusen (DE)

(73) Assignee: Lanxess, Inc., Sarnia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/676,916

(22) Filed: Oct. 1, 2003

(65) Prior Publication Data

US 2004/0110904 A1    Jun. 10, 2004

(30) Foreign Application Priority Data

Mar. 10, 2002    (CA)    ................................ 2406775

(51) Int. Cl.
*C08F 10/10*    (2006.01)
*C08L 9/00*    (2006.01)

(52) U.S. Cl. .............................. 525/333.7; 525/332.5; 525/387; 524/543; 524/575

(58) Field of Classification Search ............. 525/333.7, 525/387, 263, 332.5; 524/543, 574
See application file for complete search history.

(56) References Cited

U.S. PATENT DOCUMENTS

| | | | |
|---|---|---|---|
| 3,584,080 A | 6/1971 | Walker et al. | 260/889 |
| 5,021,509 A * | 6/1991 | Keller et al. | 525/221 |
| 5,395,885 A | 3/1995 | Kennedy et al. | 525/98 |
| 2004/0006184 A1 * | 1/2004 | Gronowski et al. | 525/387 |
| 2004/0014904 A1 * | 1/2004 | Gronowski et al. | 525/387 |

FOREIGN PATENT DOCUMENTS

| | | |
|---|---|---|
| GB | 1 354 340 | 3/1974 |
| JP | 6-107738 | 4/1994 |
| JP | 6-172547 | 6/1994 |
| RU | 2 130 948 | 5/1999 |

OTHER PUBLICATIONS

Journal of the Institute of the Rubber Industry, 8(2), (month unavailable) 1974, pp. 64-68, J. Walker, G.J. Wilson, and K.J. Kumbhani, "Peroxide curing of butyl rubber".

J. Marcromol. Sci.-Chem., A1(6), Oct. 1967, pp. 995-1004, J.P. Kennedy and R.G. Squires, "Contributions to the Mechanism of Isobutene Polymerization. VII. Effect of HCl and Chloroethyl Benzene and a Brief Summary of the Data".

Ullmann's Encyclopedia of Industrial Chemistry (Fifth Completely Revised Edition, vol. A23, Editors Elves et al. (date unavailable) pp. 290-292 "Rubber, 3 Synthetic".

* cited by examiner

*Primary Examiner*—James J. Seidleck
*Assistant Examiner*—Olga Asinovsky
(74) *Attorney, Agent, or Firm*—Jennifer R. Seng

(57) ABSTRACT

The present invention relates to a shaped article containing at least one peroxide curable compound containing a butyl-like polymer(s) without any conjugated aliphatic diene in its composition, said polymer containing less than 15 wt. % of solid matter insoluble in boiling cyclohexane under reflux for 60 min. The present invention also relates to a sealing material and a medical device containing at least one peroxide-curable compound containing a butyl-like polymer containing less than 15 wt. % of solid matter insoluble in boiling cyclohexane under reflux for 60 min. Further, the present invention relates to a process for producing a butyl-like polymer having no conjugated aliphatic diene in its composition and containing less than 15 wt. % of solid matter insoluble in boiling cyclohexane under reflux for 60 min. In addition, the present invention relates to a process the manufacturing of the inventive compound wherein the elastomeric polymer is mixed with at least one filler and at least one peroxide curing system in a mixing means.

11 Claims, No Drawings

PEROXIDE CURABLE COMPOUNDS BASED ON BUTYL-LIKE POLYMER WITHOUT CONJUGATED ALIPHATIC DIENES IN ITS COMPOSITION

FIELD OF THE INVENTION

The present invention relates to a shaped article containing at least one peroxide curable compound containing a butyl-like polymer(s) not having a conjugated aliphatic diene in its composition, the polymer having an average molecular weight $M_n$ of more than 20,000 g/mol and containing less than 15 wt. % of solid matter insoluble in boiling cyclohexane under reflux for 60 min. The present invention also relates to a sealing material and a medical device containing at least one peroxide-curable compound containing a butyl-like polymer having less than 15 wt. % of solid matter insoluble in boiling cyclohexane under reflux for 60 min. The present invention further relates to a process for producing a butyl-like polymer not containing conjugated aliphatic dienes in its composition, the polymer containing less than 15 wt. % of solid matter insoluble in boiling cyclohexane under reflux for 60 min. In addition, the present invention relates to a process for the manufacture of the inventive compound wherein the elastomeric polymer is mixed with at least one filler and at least one peroxide curing system in a mixing means.

BACKGROUND OF THE INVENTION

Butyl rubber is known for its excellent insulating and gas barrier properties. Generally, commercial butyl polymer is prepared in a low temperature cationic polymerization process using Lewis acid-type catalysts, such as aluminum trichloride. The process commonly used employs methyl chloride as the diluent for the reaction mixture and the polymerization is conducted at temperatures less than $-90°$ C., resulting in production of a polymer in a slurry of the diluent.

Alternatively, it is possible to produce the polymer in a diluent, which acts as a solvent for the polymer (e.g., hydrocarbons such as pentane, hexane, heptane and the like). The product polymer may be recovered using conventional techniques in the rubber manufacturing industry.

In many of its applications, butyl rubber is used in the form of cured compounds. Vulcanizing systems usually utilized for butyl rubber include sulfur, quinoids, resins, sulfur donors and low-sulfur high performance vulcanization accelerators. However, sulfur residues in the compound are often undesirable, e.g., they promote corrosion of parts in contact with the compound.

High performance applications of butyl rubber, like condenser caps or medical devices, require halogen- and sulfur-free compounds. The preferred vulcanization system in this case is based on peroxides since this produces an article free of detrimental residues. In addition, peroxide-cured compounds offer higher thermal resistance and other advantages compared to sulfur-cured materials.

If peroxides are used for cross-linking and curing of conventional butyl rubbers, the main chains of the rubber degrade and satisfactorily cured products are not obtained.

One way of obtaining peroxide curable butyl rubber is to use a regular butyl rubber with a vinyl aromatic compound like divinylbenzene (DVB) and an organic peroxide, as described in JP-A-107738/1994. Another similar way to obtain a partially cross-linked butyl rubber is to use a regular butyl rubber with an electron withdrawing group-containing polyfunctional monomer (ethylene dimethacrylate, trimethylolpropane triacrylate, N,N'-m-phenylene dimaleimide, etc.) and an organic peroxide, as disclosed in JP-A-172547/1994. The disadvantage of these methods is that the resulting compound is contaminated with the low molecular weight reagents added to induce cross-linking, which did not fully react with the rubber in the solid state. Also, the action of peroxide on the regular butyl rubber may lead to formation of some low molecular weight compounds from the degraded rubber. The final articles based on such compounds may display an undesirable characteristic of leaching out the low molecular species and accelerated aging A preferred approach nowadays is to use a commercial pre-crosslinked butyl rubber such as commercially available Bayer® XL-10000 (or, formerly XL-20 and XL-50) that can be cross-linked with peroxides, e.g., see Walker et al., "Journal of the Institute of the Rubber Industry", 8 (2), 1974, 64–68. XL-10000 is partially cross-linked with divinylbenzene already in the polymerization stage. No peroxides are present during this polymerization process which takes place via a cationic mechanism. This leads to a much 'cleaner' product than the partially cross-linked butyl disclosed in JP-A-107738/1994. In the latter case, the curing has to be continued for sufficiently long time so that both functional groups of the DVB molecules react and are incorporated into polymer chains.

While said commercial pre-cross-linked polymers exhibit excellent properties in many applications, they have a gel content of at least 50 wt. % which sometimes makes the even dispersion of fillers and curatives normally used during vulcanization difficult. This increases the likelihood of under- and over-cured areas within the rubbery article, rendering its physical properties inferior and unpredictable. Also, the Mooney viscosity of this rubber is high, usually 60–70 units (1'+8'@125° C.) which may cause significant processing difficulties, especially in mixing and sheeting stages.

British Patent 1,354,340 described a solution method for producing homo- or copolymers of isoolefins (comprising a copolymer of isobutylene and DVB)-using a mixed catalyst system composed of metal oxide/aluminum alcoholate and boron trifluoride. The process could be carried out in methyl chloride or in a hydrocarbon solvent, usually at $-65°$ C. or $-75°$ C. The content of DVB in the monomer feed could vary between 0.5% to 30%, by weight. The products had high molecular weights. However, this process is believed to result in a polymer with a high gel content due to a high amount of DVB in the feed and its uncontrolled reactions.

RU 2,130,948 discloses the copolymerization of isobutylene with DVB in an aromatic or aliphatic hydrocarbon solvent initiated with a system comprising $TiCl_4$ and tri-isobutylaluminum. The content of DVB in the monomer feed was 0.1 to 5.0 wt. %, based on isobutylene. The process was to be carried out in the temperature range $-40$ to $+40°$ C. The products had low molecular weights ($M_v$<15,000 g/mol) and were useful as additives for thickening of lubricants. The process of the present invention operates at a lower polymerization temperature and the viscosity average molecular weight of the product is higher, about 125,000–210,000 g/mol.

U.S. Pat. No. 5,395,885 discloses a multi-arm radial-star polyisobutylene obtained by the addition of excess DVB cross-linking reagent to a living polyisobutylene charge, i.e., by the "arm first" method under specific conditions. The polymerization was induced by the $TiCl_4$/2-chloro-2,4,4-trimethylpentane initiating system in the presence of triethylamine as the electron pair donor. The reactions were performed in methylene chloride/hexanes mixtures (50:50 vol.). The star polymer could be useful as a viscofier, particularly for oils, which could be obtained without the need for a post-polymerization hydrogenation step. The synthesis and the structure of this polymer are significantly different from those described in the present invention (two-stage vs. one-stage process and a star-shaped vs. random short branched/slightly crosslinked elastomer, respectively). Also, the synthesis of the multi-arm polymer was based on a living isobutylene polymerization, which is not the case in the present invention. In fact, in these special star-shaped polymers the presence of 'traditional' isobutylene-divinylbenzene polymers was undesirable and would be treated as an impurity. The content of an aromatic core in a representative star-PIB polymer was about 22 wt. %. This core was composed of homopolymerized divinylbenzene, including crosslinked species. The fact that the star polymers had virtually no residual unsaturation subsequent to star formation indicates that most likely the degree of crosslinking was high. The lack of pendant double bonds from DVB in the polymer would make it unsuitable for applications involving peroxide cure.

Furthermore, the above examples were not involved with peroxide cured compounds of the isobutylene-divinylbenzene copolymers.

Canadian Patent 817,939 teaches that in order to have peroxide-curable butyl-type polymer, the presence of an aliphatic diene, like isoprene, is not necessary in the polymerization mixture. However, the presence of an aliphatic diene can have a moderating influence on the course of polymerization thus providing a means whereby the molecular weight of the polymer can be controlled. Especially suitable amounts of isoprene are from 1% to 5% by weight of the monomer mixture comprising isobutylene, isoprene and divinylbenzene monomers. The preferred solvent is methyl or ethyl chloride, a Friedel-Crafts catalyst, such as aluminum chloride, and temperature preferably in the range −40° C. to −110° C. The especially useful content of an aromatic divinyl compound in the monomer feed is 0.5% to 3% by weight (in the neat form). The resulting polymers had a much-reduced tendency to cold flow over "regular" butyl rubbers made from the monoolefin and an aliphatic conjugated diene. This was the result of crosslinks introduced by the presence of divinyl aromatic compound in the unvulcanized polymer. Because of the existence of such crosslinks, the polymers were referred to as "cross-linked butyl" throughout the specification, which would not fulfill the requirement that polymer contains less than 15 wt. % of solid matter insoluble in boiling cyclohexane under reflux for 60 min. The above applications did not involve the presence of a chain transfer agent in the monomer feed during polymerizations.

Processability-improving polymers are often added to the pre-crosslinked butyl rubber to overcome some of these problems. Such polymers are particularly useful for improving the mixing or kneading property of a rubber composition. They include natural rubbers, synthetic rubbers (for example, IR, BR, SBR, CR, NBR, IIR, EPM, EPDM, acrylic rubber, EVA, urethane rubber, silicone rubber, and fluororubber) and thermoplastic elastomers (for example, of styrene, olefin, vinyl chloride, ester, amide, and urethane series). These processability-improving polymers may be used in the amount of up to 100 parts by weight, preferably up to 50 parts by weight, and most preferably up to 30 parts by weight, per 100 parts by weight of a partially cross-linked butyl rubber. However, the presence of other rubbers dilutes said desirable properties of butyl rubber.

SUMMARY OF THE INVENTION

The present invention provides a compound containing at least one elastomeric polymer without any conjugated aliphatic diene in its composition, the polymer having an average molecular weight $M_n$ of more than 20,000 g/mol and comprising repeating units derived from at least one $C_4$ to $C_7$ isomonoolefin monomer, at least one multiolefin cross-linking agent and at least one chain transfer agent, the polymer containing less than 15 wt. % of solid matter insoluble in boiling cyclohexane under reflux for 60 min, at least one filler and a peroxide curing system useful for the manufacture of shaped articles.

The present invention also provides a shaped article containing the above referenced compound, which is useful for high purity applications.

The present invention further provides a vulcanized article obtained by vulcanizing the compound containing the substantially gel-free peroxide-curable compound.

Additionally, the present invention provides a process for the manufacture of a substantially gel-free peroxide-curable butyl-like polymer without any conjugated aliphatic diene in its composition.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about." Also, all ranges include any combination of the maximum and minimum points disclosed and include any intermediate ranges therein, which may or may not be specifically enumerated herein.

The present invention relates to butyl-like polymers. The terms "butyl rubber", "butyl polymer" and "butyl rubber polymer" are used throughout this specification interchangeably. While the prior art in using butyl rubber refers to polymers prepared by reacting a monomer mixture comprising a $C_4$ to $C_7$ isomonoolefin monomer and a $C_4$ to $C_{14}$ multiolefin monomer or β-pinene, this invention specifically relates to elastomeric polymers comprising repeating units derived from at least one $C_4$ to $C_7$ isomonoolefin monomer, at least one multiolefin cross-linking agent and at least one chain transfer agent, which due to the lack of multiolefin monomer/conjugated aliphatic diene or β-pinene in the monomer mixture have no double bonds in the polymer chains.

In connection with the present invention the term "substantially gel-free" is understood to denote a polymer containing less than 15 wt. % of solid matter insoluble in cyclohexane (under reflux for 60 min), or for example, less than 10 wt. %, or further for example, less than 5 wt %.

The present invention is not restricted to any particular $C_4$ to $C_7$ isomonoolefin monomers. Useful $C_4$ to $C_7$ monoolefins include isobutylene, 2-methyl-1-butene, 3-methyl-1-butene, 2-methyl-2-butene, 4-methyl-1-pentene and mixtures thereof. Of, for example, the $C_4$ to $C_7$ isomonoolefin monomer can be isobutylene.

The monomer mixture does not contain multiolefin monomers, such as isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene.

The present invention is not restricted to any particular multiolefin cross-linking agent. For example, the multiolefin cross-linking agent can be a multiolefinic hydrocarbon compound. Examples of these include norbornadiene, 2-isopropenylnorbornene, 5-vinyl-2-norbornene, 1,3,5-hexatriene, 2-phenyl-1,3-butadiene, divinylbenzene, diisopropylbenzene, divinyltoluene, divinylxylene or $C_1$ to $C_{20}$ alkyl-substituted derivatives of the above compounds. Or for example, the multiolefin crosslinking agent is divinylbenzene, diisopropenyl-benzene, divinyltoluene, divinylxylene or $C_1$ to $C_{20}$ alkyl substituted derivatives of said compounds. The multiolefin crosslinking agent can be divinylbenzene or diisopropenylbenzene.

The present invention is not restricted to any chain transfer agent. However, the chain transfer agent should be a strong chain transfer agent—i.e., it should be capable of reacting with the growing polymer chain, terminate its further growth and subsequently initiate a new polymer chain. The type and amount of chain transfer agent is dependent upon the amount of cross-linking agent. At low concentrations of cross-linking agent, low amounts of chain transfer agent and/or a weak chain transfer agent can be employed. As the concentration of the cross-linking agent is increased, however, the chain transfer agent concentration should be increased and/or a stronger chain transfer agent should be selected. Use of a weak chain transfer agent should be avoided because too much of it can decrease the polarity of the solvent mixture and also would make the process uneconomical. The strength of the chain transfer agent may be determined conventionally, see, for example, J. Macromol. Sci.-Chem., A1(6) pp. 995–1004 (1967). A number called the transfer constant expresses its strength. According to the values published in this paper, the transfer constant of 1-butene is 0. For Example, the chain transfer agent can have a transfer coefficient of at least 10, or for example, at least 50. Non-limiting examples of useful chain transfer agents include 1-methylcycloheptene, 1-methyl-1-cyclopentene, 2-ethyl-1-hexene, 2,4,4-trimethyl-1-pentene, indene and mixtures thereof. Or, for example, the transfer agent can be 2,4,4-trimethyl-1-pentene.

For example, the monomer mixture to be polymerized can contain in the range of from 75% to 99.98% by weight of at least one $C_4$ to $C_7$ isomonoolefin monomer, in the range of from 0.01% to 15% by weight of a multifunctional cross-linking agent, and in the range of from 0.01% to 10% by weight of a chain-transfer agent. Or, for example, the monomer mixture can contain in the range of from 82% to 99.9% by weight of a $C_4$ to $C_7$ isomonoolefin monomer, in the range of from 0.05% to 10% by weight of a multifunctional cross-linking agent, and in the range of from 0.05% to 8% by weight of a chain-transfer agent. Further, for example, the monomer mixture can contain in the range of from 95% to 99.85% by weight of a $C_4$ to $C_7$ isomonoolefin monomer, in the range of from 0.1% to 5% by weight of a multifunctional cross-linking agent, and in the range of from 0.05% to 5% by weight of a chain-transfer agent. It will be apparent to the skilled in the art that the total of all monomers will result in 100% by weight.

The monomer mixture may contain minor amounts of one or more additional polymerizable co-monomers. For example, the monomer mixture may contain a small amount of a styrenic monomer like p-methylstyrene, styrene, α-methylstyrene, p-chlorostyrene, p-methoxystyrene, indene (including indene derivatives) and mixtures thereof. If present, the styrenic monomer can be used in an amount of up to 5.0% by weight of the monomer mixture. The values of the $C_4$ to $C_7$ isomonoolefin monomer(s) will have to be adjusted accordingly to result in a total of 100% by weight.

The use of even other monomers in the monomer mixture is possible, provided, of course, that they are copolymerizable with the other monomers in the monomer mixture.

The present invention is not restricted to a special process for preparing/polymerizing the monomer mixture. This type of polymerization is well known to the skilled in the art and usually includes contacting the reaction mixture described above with a catalyst system. The polymerization can be conducted at a temperature conventional in the production of butyl polymers—e.g., in the range of from −100° C. to +50° C. The polymer may be produced by polymerization in solution or by a slurry polymerization method. Polymerization can be conducted in suspension (the slurry method), see, for example, Ullmann's Encyclopedia of Industrial Chemistry (Fifth, Completely Revised Edition, Volume A23; Editors Elvers et al., 290–292).

The polymer according to the present invention can have a Mooney viscosity (ASTM D 1646) ML (1+8 @125° C.) in the range of from 5 to 40 units, or, for example, in the range of from 7 to 35 units.

As an example, the polymerization can be conducted in the presence of an inert aliphatic hydrocarbon diluent (such as n-hexane) and a catalyst mixture containing a major amount (in the range of from 80 to 99 mole percent) of a dialkylaluminum halide (for example diethylaluminum chloride), a minor amount (in the range of from 1 to 20 mole percent) of a monoalkylaluminum dihalide (for example isobutylaluminum dichloride), and a minor amount (in the range of from 0.01 to 10 ppm) of at least one of a member selected from the group comprising water, aluminoxane (for example methylaluminoxane) and mixtures thereof. Of course, other catalyst systems conventionally used to produce butyl polymers can be used to produce a butyl polymer which is useful herein, see, for example, "Cationic Polymerization of Olefins: A Critical Inventory" by Joseph P. Kennedy (John Wiley & Sons, Inc. © 1975, 10–12).

Polymerization may be performed both continuously and discontinuously. In the case of continuous operation, the process can be performed with the following three feed streams:

I) solvent/diluent+isomonoolefin(s) (preferably isobutene)

II) multifunctional cross-linking agent(s) and chain-transfer agent(s)

III) catalyst

In the case of discontinuous operation, the process may, for example, be performed as follows: The reactor, pre-cooled to the reaction temperature, is charged with solvent or diluent and the monomers. The initiator is then pumped in the form of a dilute solution in such a manner that the heat of polymerization may be dissipated without problem. The course of the reaction may be monitored by means of the evolution of heat.

The compound further contains at least one active or inactive filler. The filler may be:

highly dispersed silicas, prepared e.g., by the precipitation of silicate solutions or the flame hydrolysis of silicon halides, with specific surface areas of in the range of from 5 to 1000 m²/g, and with primary particle sizes of in the range of from 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas in the range of from 20 to 400 m$^2$/g and primary particle diameters in the range of from 10 to 400 nm;

natural silicates, such as kaolin and other naturally occurring silica;

glass fibers and glass fiber products (matting, extrudates) or glass microspheres;

metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide;

carbon blacks; the carbon blacks to be used here are prepared by the lamp black, furnace black or gas' black process and have preferably BET (DIN 66 131) specific surface areas in the range of from 20 to 200 m$^2$/g, e.g. SAF, ISAF, HAF, FEF or GPF carbon blacks;

rubber gels, especially those based on polybutadiene, butadiene/styrene copolymers, butadiene/acrylonitrile copolymers and polychloroprene;

or mixtures thereof.

Examples of suitable mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the tetrapolymer. For many purposes, the preferred mineral is silica, or for example, silica made by carbon dioxide precipitation of sodium silicate. Dried amorphous silica particles suitable for use in accordance with the present invention may have a mean agglomerate particle size in the range of from 1 to 100 microns, or, for example, between 10 and 50 microns or, between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trade names HiSil® 210, HiSil® 233 and HiSil® 243 from PPG Industries Inc. Also suitable are Vulkasil S and Vulkasil N, from Bayer AG.

It might be advantageous to use a combination of carbon black and mineral filler in the present inventive compound. In this combination the ratio of mineral fillers to carbon black is usually in the range of from 0.05 to 20, or, for example, 0.1 to 10. For the rubber composition of the present invention it is usually advantageous to contain carbon black in an amount of in the range of from 20 to 200 parts by weight, for example 30 to 150 parts by weight, or, for example, 40 to 100 parts by weight.

The compound further contains at least one peroxide curing system. The present invention is not limited to a special peroxide curing system. For example, inorganic or organic peroxides are suitable. For example, organic peroxides such as dialkylperoxides, ketalperoxides, aralkylperoxides, peroxide ethers, peroxide esters, such as di-tert.-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl-cyclohexane, benzoylperoxide, tert.-butylcumylperoxide and tert.-butylperbenzoate. Usually the amount of peroxide in the compound is in the range of from 1 to 10 phr (=per hundred rubber), or, for example, from 4 to 8 phr. Subsequent curing is usually performed at a temperature in the range of from 100 to 200° C., for example 130 to 180° C. Peroxides might be applied advantageously in a polymer-bound form. Suitable systems are commercially available, such as Polydispersion T(VC) D-40 P from Rhein Chemie Rheinau GmbH, D (polymerbound di-tert.-butylperoxy-isopropylbenzene).

The compound may further comprise other natural or synthetic rubbers such as BR (polybutadiene), ABR (butadiene/acrylic acid-$C_1$–$C_4$-alkylester-copolymers), CR (polychloroprene), IR (polyisoprene), SBR (styrene/butadiene-copolymers) with styrene contents in the range of 1 to 60 wt %, NBR (butadiene/acrylonitrile-copolymers with acrylonitrile contents of 5 to 60 wt %, HNBR (partially or totally hydrogenated NBR-rubber), EPDM (ethylene/propylene/diene-copolymers), FKM (fluoropolymers or fluororubbers), and mixtures of the given polymers.

The rubber composition according to the present invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. For example, the composition furthermore may contain in the range of 0.1 to 20 phr of an organic fatty acid, such as a unsaturated fatty acid having one, two or more carbon double bonds in the molecule which more preferably includes 10% by weight or more of a conjugated diene acid having at least one conjugated carbon-carbon double bond in its molecule. For example, those fatty acids have in the range of from 8–22 carbon atoms, or for example, 12–18. Examples include stearic acid, palmitic acid and oleic acid and their calcium-, zinc-, magnesium-, potassium- and ammonium salts.

The ingredients of the final compound are mixed together, suitably at an elevated temperature that may range from 25° C. to 200° C. Normally the mixing time does not exceed one hour and a time in the range from 2 to 30 minutes is usually adequate. The mixing is suitably carried out in a suitable mixing means such as an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also, Encyclopedia of Polymer Science and Engineering, Vol. 4, p. 66 et seq. (Compounding) and Vol. 17, p. 666 et seq. (Vulcanization).

Furthermore, the present invention provides shaped articles containing the inventive substantially gel-free peroxide-curable compound, which would then be vulcanized by heating it over the decomposition temperature of the peroxide and/or radiation. The resulting vulcanized shaped article obviously will not any longer contain substantial amounts of the peroxide as the peroxide should be consumed during the vulcanization. However, said vulcanized shaped article will have a superior ozone resistance as there is no unsaturation left in the polymer chains, from a multiolefin like isoprene, which is known to be attacked by ozone. Thus, there are many applications for which said vulcanized and unvulcanized articles are suitable, such as containers for pharmaceuticals, in particular stopper and seals for glass or plastic vials, tubes, parts of syringes and bags for medical and non-medical applications, condenser caps and seals for fuel cells, parts of electronic equipment, in particular insulating parts, seals and parts of containers containing electrolytes, rings, dampening devices, ordinary seals, and sealants.

The present invention will be further illustrated by the following examples.

EXAMPLES

Methyl chloride (Dow Chemical) serving as a diluent for polymerization and isobutylene monomer (Matheson, 99%) were transferred into a reactor by condensing a vapor phase. Aluminum chloride (99.99%), isoprene (99%) and 2,4,4-trimethyl-1-pentene (99%) were from Aldrich. The inhibitor was removed from isoprene by using an inhibitor removing disposable column from Aldrich. Commercial divinylbenzene (ca. 64%) was from Dow Chemical.

The mixing of a compound with carbon black (IRB #7) and peroxide (DI-CUP 40C, Struktol Canada Ltd.) was done using a miniature internal mixer (Brabender MM) from C. W. Brabender, consisting of a drive unit (Plasticorder® Type PL-V151) and a data interface module.

The Moving Die Rheometer (MDR) test was performed according to ASTM standard D-5289 on a Monsanto MDR 2000 (E). The upper die oscillated through a small arc of 1 degree.

The solubility of a polymer was determined after the sample refluxed in cylohexane over 60-minute period.

Curing was done using an Electric Press equipped with an Allan-Bradley Programmable Controller.

Stress-strain tests were carried out using the Instron Testmaster Automation System, Model 4464.

Example 1 (Comparative)

To a 50 mL Erlenmeyer flask, 0.45 g of $AlCl_3$ was added, followed by 100 mL of methyl chloride at $-30°$ C. The resulting solution was stirred for 30 min at $-30°$ C. and then cooled down to $-95°$ C., thus forming the catalyst solution.

To a 2000 mL glass reactor equipped with an overhead stirrer, 900 mL of methyl chloride at $-95°$ C. were added, followed by 100.0 mL isobutylene at $-95°$ C., 3.0 mL of isoprene at room temperature and 5.0 mL of commercial DVB at room temperature. Also, 3.0 mL of 2,4,4-trimethyl-1-pentene was added to the reactor. The reaction mixture was cooled down to $-95°$ C. and 10.0 mL of the catalyst solution was added to start the reaction.

The polymerization was carried out in MBRAUN® dry box under the atmosphere of dry nitrogen. The temperature inside the reactor was monitored using a thermocouple. The reaction was terminated after 5 minutes by adding into the reaction mixture 10 mL of ethanol containing some sodium hydroxide. The maximum temperature rise observed during the polymerization was $12.1°$ C.

The obtained polymer (Polymer 1) was steam coagulated and dried on a 6"×12" mill at ca. 105° C. followed by drying in a vacuum oven at 50° C. to a constant weight.

The yield of the reaction was 54.8% and the rubber was totally soluble in cyclohexane.

Example 2

Example 1 was repeated except that no isoprene was present in the reaction feed. The maximum temperature reached in the reactor during this polymerization was $21.9°$ C.

The yield of the reaction was 83.1 wt. % and solubility of the rubber was 94.7%.

Example 3

The Polymers 1 and 2 were compounded using the following recipe:

Polymer: 100 phr
Carbon black (IRB#7): 50 phr
Peroxide: (DI-CUP 40C): 1.0 phr

The mixing was done in a Brabender internal mixer (capacity ca. 75 cc). The starting temperature was 60° C. and the mixing speed 50 rpm. The following steps were carried out:

0 min: polymer added
1.5 min: carbon black added, in increments
7.0 min: peroxide added
8.0 min: mix removed The obtained compounds (Compounds 1 & 2) were passed through a mill (6"×12") six times with a tight nip gap.

The compounds were tested using the Moving Die Rheometer (MDR). Also, after curing at 160° C. they were tested for stress-strain properties.

The results are compared in Table 1.

TABLE 1

MDR and stress-strain characteristics of the compounds based on Polymers 1 and 2.

| Polymer from | Isoprene in the feed (mL) | DVB in the feed (mL) | MDR Δ torque (dN·m) | Hardness Shore A2 (pts.) | Stress-strain | | |
|---|---|---|---|---|---|---|---|
| | | | | | Ultimate Tensile (MPa) | Ultimate Elongation (%) | Stress @200% (MPa) |
| Example 1 comparative | 3.0 | 5.0 | 8.6 | 44 | 7.07 | 299 | 4.45 |
| Example 2 | 0 | 5.0 | 9.0 | 46 | 6.38 | 239 | 5.19 |

These results showed that Compound 2 (from Polymer 2) achieved a little higher cure state than Compound 1 (from Polymer 1). This is seen from the difference of the delta torque values (MDR cure), as well as from the results of the stress-strain tests performed on the cured compounds.

This demonstrates that according to the present invention it is possible to synthesize a peroxide-curable butyl-like polymer containing less than 15 wt. % of solid matter insoluble in cyclohexane (under reflux for 60 min) without any residual double bonds that cures better than the respective double-bond containing polymer. The ozone resistance of the inventive polymer is excellent due to the absence of unsaturation from isoprene or other conjugated aliphatic diene. These characteristics are significantly different from those of commercial peroxide-curable butyl rubber (XL-10000), which contains isoprene in its composition and whose content of an insoluble portion is greater than 70 wt. %.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims

What is claimed is:

1. A compound comprising:
   a. at least one elastomeric polymer having an average molecular weight $M_n$ of more than 20,000 g/mol and less than 15 wt. % of solid matter insoluble in boiling cyolohexane under reflux for 60 mm comprising repeating units derived from at least one $C_4$ to $C_7$ isomonoolefin monomer, at least one multiolefin cross-linking agent and at least one chain transfer agent,
   b. at least one filler and
   c. a peroxide curing system,
   wherein the elastometic polymer does not comprise a conjugated diene or a $C_4$ to $C_{14}$ multiolefin monomer, and
   wherein the chain transfer agent has a transfer coefficient of at least 10 and is 1-methylcycloheptene, 1-methyl-1-cyclopentene, 2-ethyl-1-hexene, 2,4,4-trimethyl-1-pentene, indene or a mixture thereof.

2. A compound according to claim 1, wherein the multi-olefin cross-linking agent(s) is norbornadiene, 2-isopropenyl norbornene, 5-vinyl-2-norbornene, 1,3,5-hexatriene, 2-phenyl-1,3-butadiene, divinylbenzene, diisopropenylbenzene, divinyltoluene, divinylxylene, $C_1$ to $C_{20}$ alkyl-substituted derivatives of the above compounds or mixtures thereof.

3. A compound according to claim 1, wherein the peroxide system is an organic peroxide.

4. A compound according to claim 3, wherein the peroxide system is dialkylperoxides, ketalperoxides, aralkylperoxides, peroxide ethers, peroxide esters, such as di-tert.-butylperoxide, bis-(tert.-butylperoxy-isopropyl)-benzene, dicumylperoxide, 2,5-dimethyl-2,5-di(tert.-butylperoxy)-hexane, 2,5-dimethyl-2,5-di(tert.-butylperoxy)-hexene-(3), 1,1-bis-(tert.-butylperoxy)-3,3,5-trimethyl -cyclohexane, benzoylperoxide, tert.-butylcumylperoxide, tert.-butylperbenzoate or a mixture thereof.

5. A compound according to claim 1, wherein the polymer comprises one or more additional polymerizable co-polymers selected from the group consisting of p-methylstyrene, styrene, α-methylstyrene, p-chlorostyrene, p-methoxystyrene, indene and mixtures thereof.

6. A compound according to claim 1 further comprising a rubber selected from the group consisting of polybutadiene, butadiene/acrylic acid-$C_1$–$C_4$-alkylester-copolymers, polychloroprene, polyisoprene, styrene/butadiene-copolymers with styrene contents in the range of 1 to 60 wt %, butadiene/acrylonitrile-copolymers with acrylonitrile contents of 5 to 60 wt %, partially or totally hydrogenated NBR-rubber, ethylene/propylene/diene-copolymers, fluoropolymers, fluororubbers and mixtures.

7. A process for the manufacturing of a compound according to claim 1, wherein the elastomeric polymer is mixed with at least one filler and at least one peroxide curing system in a mixing means.

8. A process for the manufacturing of an elastomeric polymer comprising the step of polymerizing a monomer mixture comprising at least one $C_4$ to $C_7$ isomonoolefin monomer, at least one multifunctional cross-linking agent, and at least one chain-transfer agent in the presence of a catalyst, wherein the polymer contains less than 15 wt. % of solid matter insoluble in boiling cyclohexane under reflux for 60 mm and has no double-bonds in the polymer chain, and wherein the chain transfer agent has a transfer coefficient of at least 10 and is 1-methylcycloheptene, 1-methyl-1-cyclopentene, 2-ethyl-1-hexene, 2,4,4-trimethyl-1-pentene, indene,or a mixtures thereof.

9. A shaped article comprising a compound according to claim 1.

10. A vulcanized shaped article prepared by vulcanizing a shaped article according to claim 6.

11. A compound comprising:
    a. at least one elastomeric polymer having an average molecular weight $M_n$ of more than 20,000 g/mol and less than 15 wt. % of solid matter insoluble in boiling cyclohexane under reflux for 60 mm comprising repeating units derived from at least one $C_4$ to $C_7$ isomonoolefin monomer, at least one multiolefin cross-linking agent and at least one chain transfer agent,
b. at least one filler, and
c. a peroxide curing system, wherein the compound is isoprene free, wherein the polymer does not comprise a conjugated diene or a $C_4$–$C_{14}$ multiolefin monomer and wherein the chain transfer agent has a transfer coefficient of at least 10 and is 1-methylcycloheptene, 1-methyl-1-cyclopentene, 2-ethyl-1-hexene, 2,4,4-trimethyl-1-pentene, indene, or a mixtures thereof.

* * * * *